(12) United States Patent
Kinoshita et al.

(10) Patent No.: US 8,435,336 B2
(45) Date of Patent: May 7, 2013

(54) DEOXIDIZER

(75) Inventors: Kazuya Kinoshita, Saitama (JP); Yuichi Senoo, Saitama (JP); Yousuke Shibata, Saitama (JP); Isamu Yashima, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 170 days.

(21) Appl. No.: 12/996,889

(22) PCT Filed: Jul. 6, 2009

(86) PCT No.: PCT/JP2009/062306
§ 371 (c)(1),
(2), (4) Date: Dec. 8, 2010

(87) PCT Pub. No.: WO2010/004963
PCT Pub. Date: Jan. 14, 2010

(65) Prior Publication Data
US 2011/0086757 A1 Apr. 14, 2011

(30) Foreign Application Priority Data
Jul. 11, 2008 (JP) ................................. 2008-181876

(51) Int. Cl.
| | |
|---|---|
| *B01D 59/26* | (2006.01) |
| *C01B 3/00* | (2006.01) |
| *C01B 6/00* | (2006.01) |
| *C02F 1/70* | (2006.01) |
| *C06B 23/00* | (2006.01) |
| *C06B 43/00* | (2006.01) |
| *C09K 3/00* | (2006.01) |
| *C01F 17/00* | (2006.01) |
| *B32B 9/00* | (2006.01) |
| *B32B 19/00* | (2006.01) |
| *B01J 20/00* | (2006.01) |

(52) U.S. Cl.
USPC ........ 96/154; 252/188.28; 428/702; 423/263; 502/403

(58) Field of Classification Search .................. 423/263, 423/21.1, 219; 502/304, 400, 402; 252/188.28; 96/154; 428/702
See application file for complete search history.

(56) References Cited

U.S. PATENT DOCUMENTS
| | | | | | |
|---|---|---|---|---|---|
| 4,885,145 | A | * | 12/1989 | Kay et al. | 423/230 |
| 5,326,737 | A | * | 7/1994 | Kay et al. | 502/400 |
| 2009/0126573 | A1 | | 5/2009 | Kinoshita | |

FOREIGN PATENT DOCUMENTS
| | | |
|---|---|---|
| JP | 2005-104064 | 4/2005 |
| WO | WO2007/069735 | 6/2007 |
| WO | WO2008/001745 | 1/2008 |

OTHER PUBLICATIONS

International Search Report, PCT/JP2009/062306, Oct. 6, 2009.
Notification of the First Office Action dated Jul. 23, 2012 issued by the State Intellectual Property Office (SIPO) of the People's Republic of China in counterpart Chinese Patent Application No. 200980122065.0 with English translation, 16 pages.

* cited by examiner

*Primary Examiner* — Anthony J Zimmer
(74) *Attorney, Agent, or Firm* — Young & Thompson

(57) ABSTRACT

A deoxidizer includes a porous body of fluorite-type cerium oxide represented by $CeO_x$ (where x is a positive number smaller than 2) and having a reversible oxygen deficiency. The deoxidizer has a specific surface area of 0.6 to 1.8 $m^2/g$ and a pore median diameter of 1.6 to 5.3 µm. The cerium oxide used for the deoxidizer is produced by: firing a cerium-containing salt in the atmosphere at 500° C. to 1400° C. for 1 to 20 hours, to produce fluorite-type cerium oxide composed of a porous body; and firing the cerium oxide at 700° C. to 1100° C. for 1 to 3 hours in a reducing atmosphere having a hydrogen concentration equal to or above the lower explosive limit, to remove oxygen from the cerium oxide and produce the fluorite-type cerium oxide represented by $CeO_x$ and having a reversible oxygen deficiency.

19 Claims, 2 Drawing Sheets

DEOXIDIZER

TECHNICAL FIELD

This invention relates to a deoxidizer containing cerium oxide.

BACKGROUND ART

Applicant has previously proposed cerium oxide having a powder form with a specific surface area of 0.6 m²/g or less as a deoxidizer containing cerium oxide (see Patent Literature 1). The reduced specific surface area of this type of cerium oxide prevents abrupt reaction with oxygen even when it is brought into direct exposure to the atmosphere, thus eliminating the possibility of ignition.

As seen above, reducing the specific surface area provides the advantage of preventing abrupt reaction with oxygen. However, excessive reduction in the specific surface area will give rise to a decrease in oxygen absorption rate. Therefore, what is desired is a technique of increasing the oxygen absorption rate to the extent possible while preventing abrupt reaction with oxygen.

Meanwhile, one of the primary applications of deoxidizers relates to storage of foods. Food storage not only involves storage at room temperature, but in many cases also involves storage in low-temperature environments such as in refrigerators. Accordingly, there is a demand for deoxidizers exhibiting less degradation in oxygen absorptivity even in low-temperature environments.

Patent Literature 1: WO 2007/069735 A1

SUMMARY OF INVENTION

Technical Problem

An object of the invention is to provide a deoxidizer with further improved properties as compared to conventional art described above.

Solution to Problem

The invention provides a deoxidizer composed of a porous body of fluorite-type cerium oxide represented by $CeO_x$ (where x is a positive number smaller than 2) and having a reversible oxygen deficiency. The deoxidizer has a specific surface area of 0.6 to 1.8 m²/g and a pore median diameter of 1.6 to 5.3 μm.

The invention also provides a process of producing cerium oxide used for the above-mentioned deoxidizer, including:

firing a cerium-containing salt or a hydrate thereof in the atmosphere at 500° C. to 1400° C. for 1 to 20 hours, to produce fluorite-type cerium oxide composed of a porous body; and firing the cerium oxide at 700° C. to 1100° C. for 1 to 3 hours in a reducing atmosphere having a hydrogen concentration equal to or above the lower explosive limit, to remove oxygen from the cerium oxide and produce the fluorite-type cerium oxide represented by $CeO_x$ (where x is a positive number smaller than 2) and having a reversible oxygen deficiency.

Advantageous Effects of Invention

In this invention, cerium oxide is composed as a porous body, and the size of the pores in the porous body and the specific surface area of the porous body are controlled. In this way, the oxygen absorption rate can be increased while preventing abrupt reaction with oxygen, and particularly, the oxygen absorption rate at low temperatures can be increased.

DESCRIPTION OF EMBODIMENTS

Figure 1:
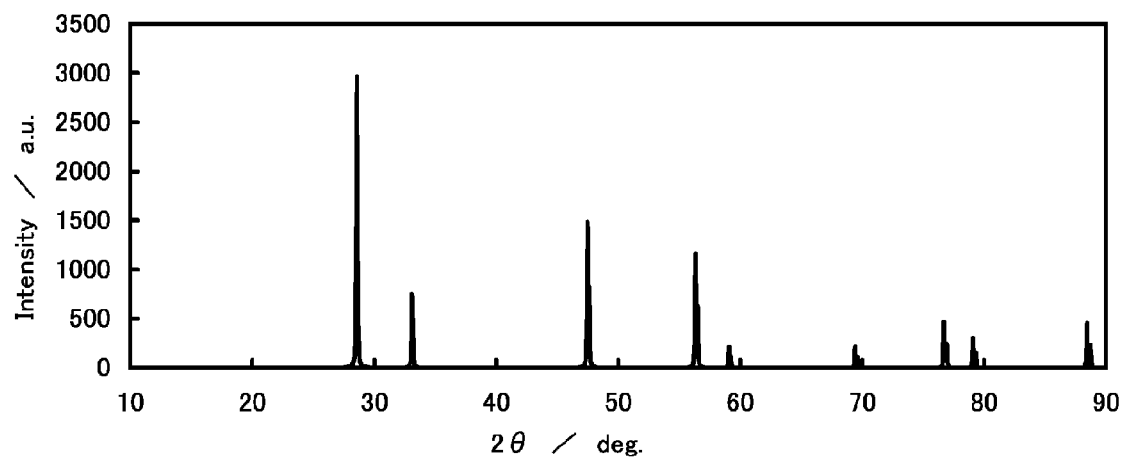
FIG. 1 shows XRD measurements of oxygen-non-deficient cerium oxide before reduction firing obtained according to Example 1.

The present invention will be described according to preferred embodiments thereof. The cerium oxide used as a deoxidizer of the invention is represented by $CeO_x$ (where x is a positive number smaller than 2), and some of the oxygen-atom crystal sites in the cerium oxide crystal are vacant. The vacant sites can absorb oxygen. The value of "x" in $CeO_x$ is controlled in accordance with the conditions for reduction as described further below. Here, "x" is preferably $1.5<x<2$, more preferably $1.5<x\leq1.8$, and even more preferably $1.5<x\leq1.7$. Oxygen absorption owing to cerium oxide represented by $CeO_x$ occurs in a living-environment atmosphere. Herein, a "living-environment atmosphere" does not encompass severe, high-temperature and/or high-pressure atmospheres caused, for example, by exhaust gases emitted from motive engines that work on fossil fuels. Rather, a "living-environment atmosphere" refers, for example, to a common atmosphere for storage of products such as foods, electronic components, and medicines. The pressure ranges, for example, from reduced-pressure states in product packaging (such as vacuum packaging) to pressurized states (e.g., for pressure-and-heat sterilization in retort processing, for retaining the shapes of packets, etc.). The temperature ranges from around −50° C. (freeze storage) to 180° C. (retort processing of foods). The surrounding atmosphere does not necessarily have to be air, and the atmosphere may be purged with an inert gas such as nitrogen gas to lower the oxygen concentration. The cerium oxide used in the present invention has oxygen vacancies due to removal of oxygen from its crystal lattice, which is caused by reduction of cerium oxide with no oxygen vacancy. Reduction is conducted, for example, in a relatively high-concentration hydrogen-gas atmosphere at high temperatures, as will be described further below. Also, a reducing gas, such as acetylene gas or carbon monoxide gas, may be used in place of hydrogen gas; in this case also, a relatively high concentration is employed for the reducing gas concentration, and high temperatures are employed.

Two types of oxygen vacancies of cerium oxide are known: reversible vacancies and irreversible vacancies. "Reversible vacancies" refer to the type of oxygen vacancies of the cerium oxide contained in the deoxidizer of the present invention, and are created by forcibly removing oxygen through processing under strong reducing conditions. Reversible vacancies are the type of vacancies in which the vacant sites can take in oxygen. For example, in cerium oxide having reversible vacancies, a portion of tetravalent cerium is reduced to the trivalent state to compensate for the imbalance in electrical charge due to lack of oxygen. Trivalent cerium is unstable and thus easily returns to the tetravalent state. Therefore, when the vacant site takes in oxygen, the trivalent cerium returns to its tetravalent state, and in this way, the balance in electrical charge is always kept equal.

On the other hand, "irreversible vacancies" are created by doping cerium oxide with an element having a lower valence than that of cerium. Different from reversible vacancies, irreversible vacancies are not created by processing under strong reducing conditions. Rather, irreversible vacancies are created, for example, by mixing, to cerium oxide, an oxide of an element having a lower valence than that of cerium and firing the mixture in the atmosphere. The cerium atoms in cerium oxide having irreversible vacancies are all tetravalent. Accordingly, the vacant sites will not take in oxygen. For example, consider a case where 20% by mol of calcium is dissolved, in a solid state, in $CeO_2$ (i.e., $Ce_{0.8}Ca_{0.2}O_2$). In this case, the average cation valence is 3.6 (i.e., 4×0.8+2×0.2); thus, in order to balance the oxygen's electrical charge with the above-described average cation valence, the number of oxygen atoms will be 1.8 (3.6÷2), which means that the number of necessary oxygen atoms is smaller than 2. This difference creates an oxygen vacancy, but this oxygen vacancy cannot absorb oxygen. As seen above, an irreversible vacancy is not a result of forcibly removing oxygen, but is caused by electrical-charge compensation within cerium oxide.

Meanwhile, besides cerium oxide having a reversible oxygen deficiency as used in the present invention, OSC (oxygen storage/release capacity) materials are known as inorganic oxides capable of absorbing oxygen. OSC materials are often used as promoters of automotive catalysts. OSC materials make use of oxygen ion conduction of cerium oxide and the change in valence seen in rare-earth elements, to take in oxygen from the surrounding atmosphere and simultaneously release oxygen, thereby keeping the amount of oxygen in the surrounding atmosphere constant. However, OSC materials can take in and release oxygen only at high temperatures in the order of several hundred degrees Celsius. Therefore, OSC materials cannot take in nor release oxygen in a living-environment atmosphere as in the present invention. This is because OSC materials do not have oxygen vacancies that are reversible in a living-environment atmosphere.

Cerium oxide used in this invention undergoes reduction in a strong-reducing atmosphere, during which oxygen is forcibly removed from the crystal lattice of cerium oxide to create oxygen vacancies ($CeO_{2-y}$, where y represents a positive number smaller than 2) as represented by equation (1) below, and thus contains oxygen-absorbable sites. These oxygen vacancies are the above-described reversible vacancies. Then, as represented by equation (2) below, the oxygen-absorbable sites react with oxygen in the living-environment atmosphere, thus producing the effect as a deoxidizer. Cerium oxide used in this invention is of the fluorite type and is thus stable in structure and can stably retain the oxygen-absorbable sites created by the oxygen vacancies. Further, cerium oxide used in this invention has high oxygen ion conduction; thus, oxygen can enter/exit to/from deep inside the crystal, which provides good oxygen absorptivity.

$$CeO_2 + yH_2 \rightarrow CeO_{2-y} + yH_2O \qquad (1)$$

$$CeO_{2-y} + (y/2)O_2 \rightarrow CeO_2 \qquad (2)$$

One feature of the cerium oxide used in this invention is that it is in the form of a particulate porous body. In other words, the cerium oxide used in this invention has a multitude of pores. The pores may have an open-cell or closed-cell structure. Pores with an open-cell structure achieve sufficient oxygen absorptivity because the pores allow oxygen to be distributed deep inside the cerium oxide particles. Pores with a closed-cell structure can, however, achieve satisfactory oxygen absorptivity because of the high oxygen ion conduction of cerium oxide, as mentioned above.

Inventors' diligent research has revealed that the oxygen absorption rate can be increased while preventing abrupt reaction with oxygen by making the cerium oxide used in this invention into the form of a particulate porous body and by adjusting the particles' specific surface area as described below. Particularly, Inventors' research has revealed that the oxygen absorption rate at low temperatures (e.g. 0° C. to −50° C.) can be increased, as exemplified in the Examples described further below. From this standpoint, the pore median size (diameter) of the cerium oxide used in this invention is set to 1.6 to 5.3 µm, and preferably 1.7 to 5.0 µm. The pore median diameter is measured using, for example, an automated porosimeter "AutoPore 9520 (trade name)" from Shimadzu Corporation. Measurement using this device is conducted by sampling 0.3 g of specimen, using a standard cell (for 0.4 to 5 cc of powder), and setting the initial pressure to approx. 7 kPa.

Cerium oxide having pores with a median diameter within the above range can be produced, for example, according to the production process described further below.

In the present invention, in addition to adjusting the pore median diameter of the porous cerium oxide within the above-described range, the specific surface area of the cerium oxide particles is set within a certain range. This achieves the advantageous effects as described above. Concretely, the specific surface area is set within a range of 0.6 to 1.8 m²/g. Patent Literature 1 described in "Background Art" above discloses the need to adjust the specific surface area to 0.6 m²/g or less from the standpoint of preventing ignition in cases where cerium oxide is in powder form. In contrast, the present invention has no risk of ignition, even when the specific surface area of cerium oxide in powder form is set to 0.6 m²/g or above. Inventors believe that the main reason behind this is the existence of the pores, which are thought to provide the powder-form cerium oxide with a specific surface area of equal to or above 0.6 m²/g. In cases where the pores are within a certain range of smallness—that is, the pore median diameter is within the above-described range of 1.6 to 5.3 µm—molecules are prevented from easily entering the pores, and thus the reactivity of cerium oxide does not become too high despite its large specific surface area, which suppresses the possibility of ignition.

Further, Inventors believe that the reason why the oxygen absorption rate of cerium oxide of the present invention can be kept high even at low temperatures is because the pores contribute to increase the particle's specific surface area while preventing ignition. From this standpoint, the higher the upper limit of the specific surface area, the more preferable it would be. However, in the present invention, the upper limit of the specific surface area is set to 1.8 m²/g. The reason for this is as follows. For example, in case of using cerium carbonate as the starting material and oxidizing this into cerium oxide, the firing step will take at least 1 hour at 400° C. or above in the atmosphere. In this case, the upper limit for a deoxidizer obtained as a result of the subsequent reduction step will, in many cases, be equal to or below the above-described value.

The specific surface area of cerium oxide of this invention is measured using "SA-3100 (model number)" from Beckman Coulter.

The cerium oxide used in this invention has a high oxygen absorption rate as well as a large oxygen absorption amount. More specifically, the oxygen absorption amount at 25° C., 1 atm., is 5 to 37 mL/g, and particularly 15 to 34 mL/g, which is an extremely high value close to the theoretical limit Note that the theoretical limit of the oxygen absorption amount of cerium oxide having a reversible oxygen deficiency is 37.2 mL/g.

The oxygen absorption amount is measured as follows. First, 2 g of cerium oxide is sampled and placed inside a packeting material having air resistance (air resistance: 10 to 1,000,000 seconds). The size of the packeting material having air resistance is not particularly limited as long as it can contain 2 g of cerium oxide. Separately, another packeting material having the same air resistance and size and made of the same material, but not containing cerium oxide, is prepared. Note that it is desirable to perform these operations in an inert atmosphere such as in nitrogen or argon. Next, the packeting material containing the cerium oxide is exposed to the atmosphere (at 25° C., 1 atm.), and is weighed at predetermined time intervals using a high-precision electronic balance (with at least four decimal places). The increase in weight is caused by oxygen absorption, so the amount of oxygen absorbed can be found using the equation of state of gas. Note that in order to correct the weight increase due to moisture adhering to the packeting material, the packeting material not containing cerium oxide is weighed simultaneously, and the weight thereof is subtracted from the weight of the packeting material containing cerium oxide. Herein, air resistance is measured according to JIS P8117, and refers to the time required until 100 mL of air finishes passing through an area of 0.000642 $m^2$ at a pressure difference of 1.23 kPa.

The oxygen absorption rate is defined as the slope of a graph showing the relationship between time and the oxygen absorption amount measured according to the above-described method.

While the pore size and specific surface area of the cerium oxide used in this invention are as described above, the cerium oxide particles preferably have a maximum particle size $D_{99}$ of 20 µm or less, and more preferably 10 µm or less. Such a maximum particle size is advantageous in that, in cases where a resin composition containing the cerium oxide particles is formed into a film, the cerium oxide particles are less prone to show up on the film's surface, which prevents the particles from damaging the layers provided on both sides of the film and thus eliminates the possibility of causing strength reduction, and also the oxygen barrier properties can be improved. The maximum particle size $D_{99}$ is measured using a particle size distribution analyzer "LA-920 (model number)" from Horiba, Ltd.

The cerium oxide particles used in the present invention are not particularly limited in terms of shape; they may have a certain shape, or may have irregular shapes.

The cerium oxide of the present invention may be used, for example, as a deoxidizer packet including a packeting material having air resistance and containing the cerium oxide therein. Alternatively, the cerium oxide particles may be kneaded into an oxygen-permeable resin to form a deoxidizing resin composition. The resin composition may be used, for example, in the form of pellets to serve as materials for various formed bodies made of resin. Further, the resin composition may be used, for example, in the form of various resin-formed bodies made from the pellets, such as deoxidizing films having a deoxidizer layer or deoxidizing trays. Furthermore, the deoxidizer layer may have, on one side, an oxygen barrier layer having oxygen bather properties and may have, on the other side, an oxygen-permeable layer having oxygen permeability, to form a multi-layer deoxidizing film/tray. Regardless of the form of the deoxidizing resin composition, the percentage of the deoxidizer within the resin composition is preferably 10 to 90% by weight, and more preferably 20 to 80% by weight, from the standpoint of achieving sufficient deoxidizing effects. On the other hand, the percentage of resin within the resin composition is preferably 10 to 90% by weight, and more preferably 20 to 80% by weight, from the standpoint of retaining the strength and formability of the resin composition.

Another way of using the resin composition may be to press the oxygen-deficient cerium oxide powder into formed bodies, such as tablets or flakes, and place the formed bodies inside a packeting material having air resistance.

Next, a preferred process of producing cerium oxide used in this invention will be described below. First, a cerium-containing salt or a hydrate thereof (collectively referred to hereinafter simply as "cerium-containing salt") is fired, to produce cerium oxide. The cerium oxide, at this stage, has a fluorite-type structure represented by $CeO_2$ and includes cerium and oxygen substantially at the stoichiometric ratio. Therefore, the cerium oxide, at this stage, does not have any oxygen vacancies. The term "substantially" is used in the sense of allowing the presence of trace amounts of inevitable impurities. The cerium-containing salt is fired in the atmosphere. Firing does not necessarily have to be done in the atmosphere and is possible in any oxidizing atmosphere, but firing in the atmosphere is preferable when giving consideration to industrial-scale production.

Inventors' diligent research has revealed that the conditions for this firing step are important in order to obtain the intended cerium oxide composed of porous bodies and having a reversible oxygen deficiency. More specifically, employing a firing temperature range of 500 to 1400° C., preferably 600 to 1300° C., and a firing time range of 1 to 20 hours, preferably 1 to 5 hours, will produce oxygen-non-deficient cerium oxide (cerium oxide without oxygen deficiency) composed of porous bodies. If the firing temperature is below the above-described range or the firing time is shorter than the above-described range, then firing will not proceed sufficiently and oxidation of the cerium-containing salt will not proceed successfully. If, on the other hand, the firing temperature is above the above-described range or the firing time is longer than the above-described range, then aggregation at the grain boundary will proceed too excessively and porous bodies cannot be produced successfully, although oxygen-non-deficient cerium oxide can be obtained. In contrast, setting the firing temperature and firing time within the respective ranges described above allows porous bodies to be produced successfully, owing to oxidation-decomposition of the cerium-containing salt and volatilization of the products of decomposition.

The temperature-rise rate during the firing step is also important in order to obtain the intended cerium oxide composed of porous bodies and having a reversible oxygen deficiency. This is because employing an appropriate temperature-rise rate allows oxidation-decomposition of the cerium-containing salt to proceed moderately and the product of decomposition to volatilize, thereby allowing porous bodies having pores of the desired size to be produced successfully. From this standpoint, the temperature-rise rate is preferably 0.5 to 50° C./minute, more preferably 1 to 30° C./minute.

The type of cerium-containing salt is not particularly limited as long as it produces cerium oxide as a result of firing, but in particular, it is preferable to use an oxygen-containing cerium salt as the cerium-containing salt. The reason is that this facilitates making cerium oxide porous owing to the product of decomposition (e.g., carbon dioxide in case of cerium carbonate). An "oxygen-containing cerium salt" is a cerium (III) compound composed of chemical species wherein the anion paired with the cerium (III) ion contains oxygen. Examples of oxygen-containing anions include carbonate ions, nitrate ions, sulfate ions, and hydroxide ions. Examples of useful cerium compounds containing such an oxygen-containing anion include cerium carbonate hydrate (hexahydrate, octahydrate, etc.), cerium nitrate, ceric ammonium nitrate, cerium sulfate, ceric ammonium sulfate, cerium hydroxide, cerium oxalate, cerium acetylacetonate, and cerium trifluoromethanesulfonate. Among them, preferably used are, for example, cerium carbonate and cerium hydroxide which are cerium-containing salts whose products of decomposition easily volatilize by firing.

Firing of the cerium-containing salt can be done, for example, while circulating air in a heating furnace in which the cerium-containing salt has been placed. Alternatively, a rotary kiln furnace, for example, may be used, and the cerium-containing salt, flowing (rolling) in the furnace, may be fired while circulating air therein. In either case, it is preferable to adjust the particle size of the cerium-containing salt to be fired using a pulverizer, such as a ball mill, before firing.

The porous bodies of oxygen-non-deficient cerium oxide obtained as above have a pore median diameter of preferably 1.6 to 5.3 µm, and more preferably 1.7 to 5.0 µm. The cerium oxide is then subjected to strong reduction in a reducing atmosphere, during which oxygen is removed from the cerium oxide to thus produce cerium oxide having a reversible oxygen deficiency. The cerium oxide is represented by $CeO_x$ (where x is a positive number smaller than 2).

Strong reduction of cerium oxide is necessary to create reversible oxygen deficiencies in cerium oxide. With this aim, a hydrogen-containing atmosphere having a hydrogen concentration equal to or above the lower explosive limit, and preferably equal to or above 20% by volume, is used as the reducing atmosphere. Needless to say, the hydrogen concentration may be 100% by volume. The temperature range employed is 700 to 1100° C., preferably 800 to 1050° C., more preferably 800 to 1000° C., and the time range employed is 1 to 3 hours, preferably 1 to 2 hours Employing these conditions prevents aggregation at the grain boundary and allows production of oxygen-deficient cerium oxide composed of porous bodies having the intended pore diameter. If the reduction temperature is below the above-described range or the reduction time is shorter than the above-described range, then reduction will not proceed sufficiently and cerium oxide having reversible oxygen deficiencies cannot be produced successfully. If, on the other hand, the reduction temperature is above the above-described range or the reduction time is longer than the above-described range, then aggregation at the grain boundary will proceed too excessively and porous bodies cannot be produced successfully, although cerium oxide having reversible oxygen deficiencies can be obtained. The temperature-rise rate is preferably 0.5 to 50° C./minute, more preferably 1 to 30° C./minute. Note that the reducing atmosphere is generally at normal pressure (atmospheric pressure), but instead, pressurized conditions or reduced-pressure conditions may be used. Appropriately controlling the conditions for reduction allows the value of "x" in $CeO_x$ to be controlled.

Reduction of the oxygen-non-deficient cerium oxide can be done, for example, while circulating a reducing gas in a heating furnace in which the cerium oxide has been placed. Alternatively, a rotary kiln furnace, for example, may be used, and the oxygen-non-deficient cerium oxide, flowing (rolling) in the furnace, may be reduced while circulating a reducing gas therein. In either case, where a 100% hydrogen atmosphere is to be used as the reducing atmosphere, the circulation amount is preferably 1 to 500 SCCM per gram of cerium oxide.

Before reduction, the particle size of the oxygen-non-deficient cerium oxide may be adjusted using a ball mill etc. This operation will provide a desirable particle size to the intended cerium oxide having reversible oxygen deficiencies and will also facilitate adjusting the specific surface area within the above-described range.

Note that reduction according to the above-described conditions will not change the crystal system of cerium oxide and the fluorite-type crystal structure will be retained. Meanwhile, reduction according to the above-described conditions will slightly reduce the diameter of the pores that had been previously present in cerium oxide prior to reduction.

The intended cerium oxide having reversible oxygen deficiencies can be produced according to the above process. The specific surface area and pore median diameter of the cerium oxide will fall within the respective ranges described above. Note that the present cerium oxide having reversible oxygen deficiencies is generally used as-is for its intended purpose, without being subjected to subsequent post-processing for controlling particle size, such as pulverizing. This is because post-processing, such as pulverizing, is usually conducted in the atmosphere, and cerium oxide may absorb oxygen contained in the atmosphere during that process and thus lose its oxygen absorptivity, which may lead to circumstances where the cerium oxide will not exert sufficient oxygen absorptivity during actual use. Therefore, there is no prohibition against performing post-processing for controlling particle size, such as pulverizing, in an inert atmosphere.

Although the present invention has been described above according to preferred embodiments thereof, the invention is not to be limited thereto. For example, in order to drastically increase the oxygen absorption amount, the cerium oxide having reversible oxygen deficiencies used in this invention may be doped with at least one of yttrium (Y), calcium (Ca), and praseodymium (Pr) to make a composite oxide having the dopant element in the form of a substitutional solid solution. The amount of element doped with respect to cerium is preferably 1 to 20% by mol.

EXAMPLES

The present invention will be described in further detail below according to Examples thereof. The scope of the invention, however, is not to be limited to these Examples.

Example 1

(1) Synthesis of Oxygen-Non-Deficient Cerium Oxide

First, 100 g of cerium carbonate was placed in a heating furnace and was heated and fired therein while circulating air. Heating was started from room temperature, and the temperature was raised at a temperature-rise rate of 10° C./minute until it reached 500° C. and kept at that temperature for 20 hours. The system was then left to cool naturally. The air circulation amount was 1000 SCCM. The above process yielded porous bodies of oxygen-non-deficient cerium oxide. Through XRD measurement, it was confirmed that the cerium oxide was represented by $CeO_2$ and had a fluorite-type crystal structure. FIG. 1 shows the XRD measurements. The cerium oxide obtained was pulverized using a ball mill The cerium oxide had a pore median diameter of 1.7 µm and a specific surface area of 3.15 m²/g.

(2) Synthesis of Oxygen-Deficient Cerium Oxide

Figure 2:
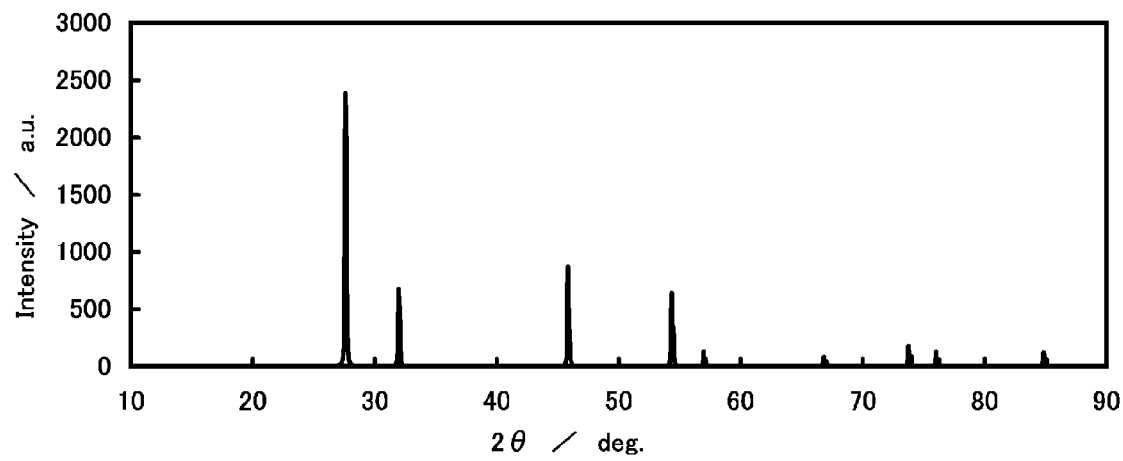
FIG. 2 shows XRD measurements of oxygen-deficient cerium oxide after reduction firing obtained according to Example 1.

The cerium oxide (50 g) obtained in (1) above was placed in a heating furnace and was heated and reduced therein while circulating 100% hydrogen gas. Heating was started from room temperature, and the temperature was raised at a temperature-rise rate of 10° C./minute until it reached 1000° C. and kept at that temperature for 1 hour. The system was then left to cool naturally. The hydrogen-gas circulation amount was 1000 SCCM. The above process yielded porous bodies of cerium oxide having reversible oxygen deficiencies. Through XRD measurement, it was confirmed that the cerium oxide had a fluorite-type crystal structure, despite the fact that the peaks observed were all slightly shifted toward the low-angle side compared to the peaks in FIG. 1. FIG. 2 shows the XRD measurements. The cerium oxide obtained had a pore median diameter of 1.6 µm, a specific surface area of 1.81 m$^2$/g, and a maximum particle size $D_{99}$ of 13.24 µm. Elementary analysis showed that the cerium oxide was represented by $CeO_{1.75}$.

Examples 2 to 5 and Comparative Examples 1 to 5

Porous bodies of cerium oxide having reversible oxygen deficiencies were produced in the same way as in Example 1, except that the firing conditions in (1) and the reducing conditions in (2) of Example 1 were changed to the values shown in Table 1 below. The pore median diameter, the specific surface area, and the maximum particle size $D_{99}$ of the cerium oxide obtained are also shown in Table 1. Elementary analyses showed that the cerium oxide obtained according to the Examples and Comparative Examples was represented by $CeO_{1.75}$.

TABLE 1

| | | Examples | | | | | Comparative Examples | | | | |
|---|---|---|---|---|---|---|---|---|---|---|---|
| | | 1 | 2 | 3 | 4 | 5 | 1 | 2 | 3 | 4 | 5 |
| Firing Conditions | Temperature- Rise Rate ° C./min | 10 | 10 | 10 | 10 | 10 | 10 | 10 | 10 | 10 | 10 |
| | Firing Temperature ° C. | 500 | 1300 | 500 | 1000 | 1300 | 1400 | 1600 | 1450 | 1500 | 1600 |
| | Firing Time h | 20 | 20 | 1 | 1 | 1 | 25 | 20 | 1 | 1 | 1 |
| Oxygen-Non-Deficient Cerium Oxide | Average Particle Size $D_{50}$ µm | 3.17 | 7.00 | 4.42 | 4.43 | 5.80 | 7.13 | 10.95 | 6.82 | 9.34 | 10.15 |
| | Pore Median Diameter µm | 1.7 | 5.0 | 1.8 | 2.8 | 3.7 | 5.1 | 3.7 | 5.1 | 4.6 | 4.0 |
| | Specific Surface Area m$^2$/g | 3.15 | 0.59 | 4.23 | 0.91 | 0.52 | 0.40 | 0.23 | 0.44 | 0.38 | 0.25 |
| Reducing Conditions | Temperature- Rise Rate ° C./min | 10 | 10 | 10 | 10 | 10 | 10 | 10 | 10 | 10 | 10 |
| | Firing Temperature ° C. | 1000 | 1000 | 1000 | 1000 | 1000 | 1000 | 1000 | 1000 | 1000 | 1000 |
| | Firing Time h | 1 | 1 | 1 | 1 | 1 | 1 | 1 | 1 | 1 | 1 |
| Oxygen-Deficient Cerium Oxide | Maximum Particle Size $D_{99}$ µm | 13.24 | 15.07 | 15.44 | 15.10 | 15.11 | 15.04 | 21.12 | 15.01 | 18.10 | 21.00 |
| | Pore Median Diameter µm | 1.6 | 5.2 | 1.9 | 2.8 | 3.9 | 5.3 | 3.9 | 4.8 | 4.8 | 4.0 |
| | Specific Surface Area m$^2$/g | 1.78 | 0.73 | 1.79 | 1.41 | 0.92 | 0.55 | 0.45 | 0.59 | 0.52 | 0.45 |

Figure 3A:
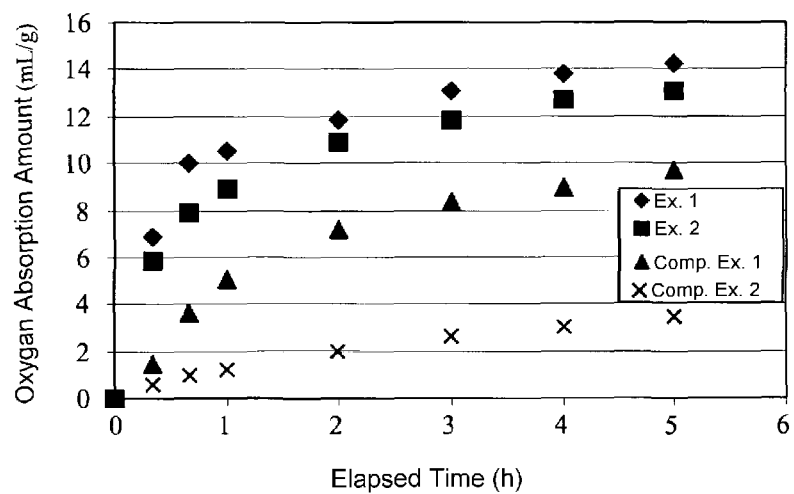
FIG. 3(a) and FIG. 3(b) are graphs showing the oxygen absorption rate of cerium oxide obtained according to the Examples and Comparative Examples.
Figure 3B:
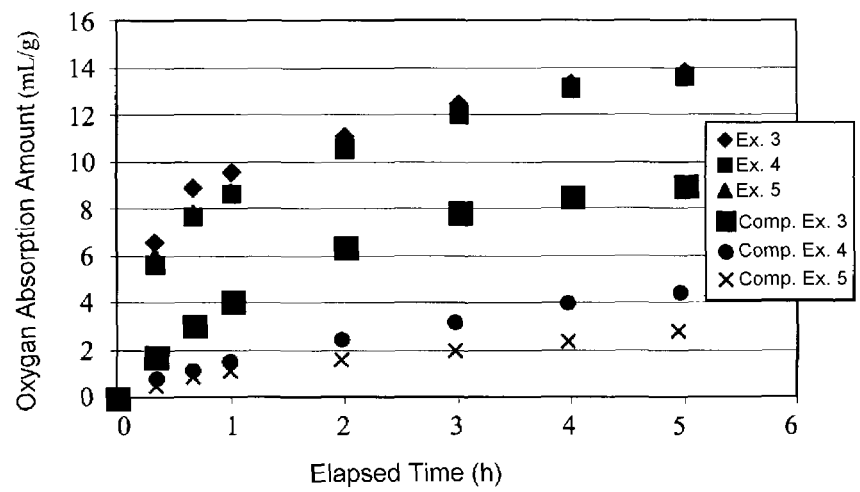

Evaluation:

The oxygen absorption amount of cerium oxide obtained in the Examples and Comparative Examples was measured according to the previously-described method, except that exposure to the atmosphere was at 0° C., 1 atm. The results are shown in FIG. 3(*a*) and FIG. 3(*b*). The results in the figures reveal that the cerium oxide obtained in the present Examples has a high oxygen absorption rate even in a low-temperature environment of 0° C. In contrast, the cerium oxide obtained in the Comparative Examples has a lower oxygen absorption rate as compared to the present Examples. Further, although not shown in the figures, the cerium oxide obtained in the present Examples did not ignite at 25° C., 1 atm.

The invention claimed is:

1. A deoxidizer, comprising a porous body of fluorite-type cerium oxide represented by $CeO_x$ and having a reversible oxygen deficiency, x being a positive number less than 2, wherein the deoxidizer has a specific surface area of 0.6 to 1.8 m$^2$/g and a pore median diameter of 1.6 to 5.3 µm.

2. The deoxidizer according to claim 1, having a maximum particle size $D_{99}$ of 20 µm or less.

3. The deoxidizer according to claim 2, comprising the fluorite-type cerium oxide doped with at least one of yttrium, calcium and praseodymium.

4. The deoxidizer according to claim 1, wherein $1.5 < x \leq 1.7$.

5. A process of producing the deoxidizer as defined in claim 1, comprising:
   firing a cerium-containing salt or a hydrate thereof in an oxidizing atmosphere at 500° C. to 1400° C. for 1 to 20 hours, to produce a porous body of cerium oxide; and
   firing the porous body of cerium oxide at 700° C. to 1100° C. for 1 to 3 hours in a reducing atmosphere having a hydrogen concentration equal to or above a lower explosive limit, to remove oxygen from the cerium oxide and produce the fluorite-type cerium oxide represented by $CeO_x$.

6. The process of producing the deoxidizer according to claim 5, wherein the cerium-containing salt is cerium carbonate, cerium hydroxide, cerium nitrate, ceric ammonium nitrate, cerium oxalate, cerium acetylacetonate, ceric ammonium sulfate, cerium trifluoromethanesulfonate, or cerium sulfate.

7. The process according to claim 5, wherein the cerium oxide in the porous body of cerium oxide is represented by $CeO_2$.

8. The process according to claim 5, wherein the oxidizing atmosphere is air.

9. The process according to claim 5, wherein the reducing atmosphere has a hydrogen concentration equal to or above 20% by volume.

10. The process according to claim 5, wherein the reducing atmosphere has a hydrogen concentration of 100% by volume.

11. The process according to claim 5, further comprising a step of pulverizing the porous body of cerium oxide before firing in the reducing atmosphere.

12. A deoxidizing resin composition comprising the deoxidizer according to claim 1 and an oxygen-permeable resin.

13. The deoxidizing resin composition according to claim 12, which is shaped into a pellet, a film, or a tray.

14. A deoxidizing resin composition comprising the deoxidizer according to claim 2 and an oxygen-permeable resin.

15. A deoxidizer packet comprising a packeting material having air resistance and the deoxidizer according to claim 1 contained in the packeting material.

16. A deoxidizer packet comprising a packeting material having air resistance and the deoxidizer according to claim 2 contained in the packeting material.

17. A deoxidizing film comprising a deoxidizer layer made of the deoxidizer according to claim 1.

18. The deoxidizing film according to claim 17, comprising the deoxidizer layer, an oxygen barrier layer provided on one side of the deoxidizer layer, and an oxygen-permeable layer provided on an other side of the deoxidizer layer.

19. A deoxidizing film comprising a deoxidizer layer made of the deoxidizer according to claim 2.

* * * * *